N. D. FERGUSON.
MILK-COOLERS.

No. 185,511. Patented Dec. 19, 1876.

WITNESSES:
Jas. F. DuHamel
H. B. Brown

INVENTOR:
N. D. Ferguson
PER
H. F. Abbot
ATTORNEY.

UNITED STATES PATENT OFFICE.

NELSON D. FERGUSON, OF CARTHAGE, NEW YORK.

IMPROVEMENT IN MILK-COOLERS.

Specification forming part of Letters Patent No. 185,511, dated December 19, 1876; application filed October 11, 1876.

*To all whom it may concern:*

Be it known that I, N. D. FERGUSON, of Carthage, in the county of Jefferson and State of New York, have invented certain new and useful Improvements in Milk-Cooler, of which the following is a specification:

My invention relates to the construction and arrangement of a milk-cooler, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
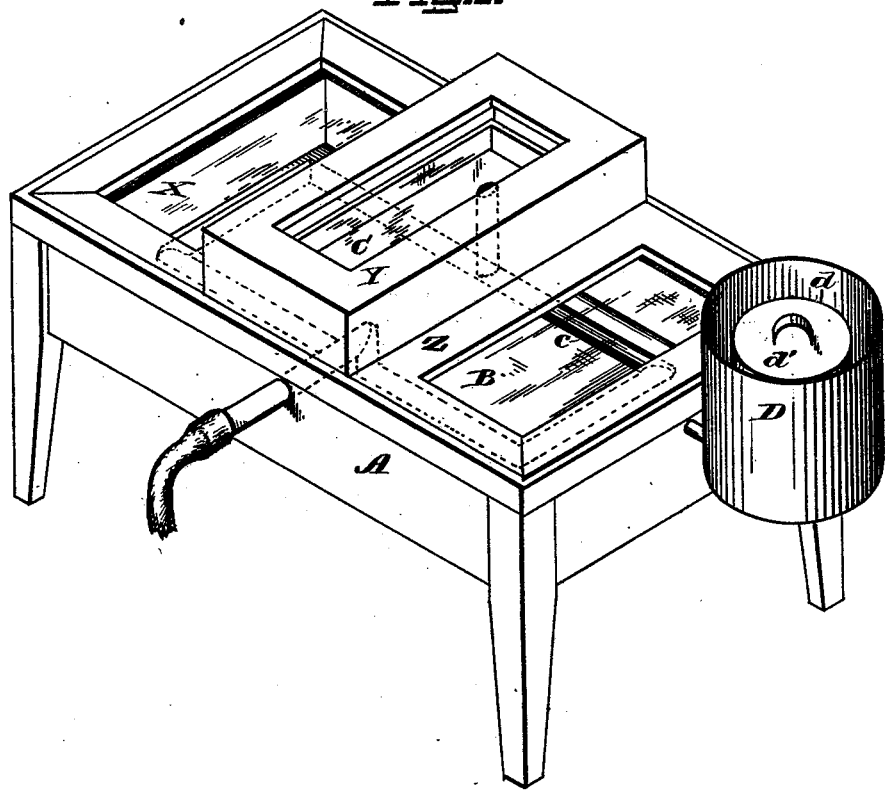
Figure 2:
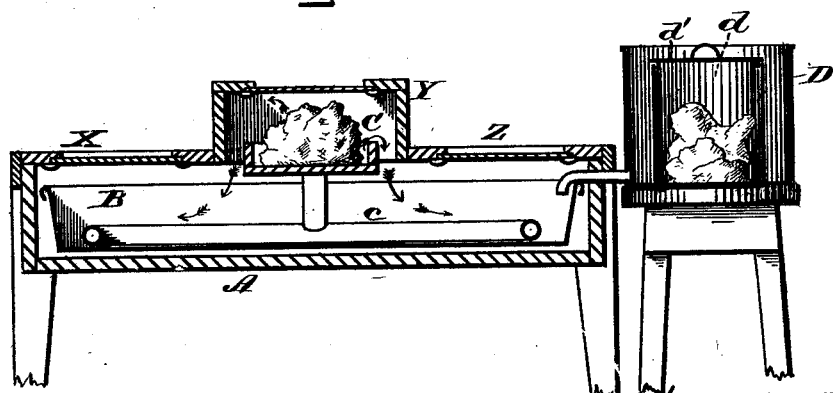

Figure 1 is perspective view. Fig. 2 is longitudinal section.

A represents a frame, of any suitable dimensions, in which the vat B is placed. C is an ice-cooler, constructed either of wood, galvanized iron, tinned iron, or other suitable material, and made in any desired shape, its ends resting on the frame A, as shown. c represents a tube, one end attached to the bottom of the ice-cooler C, the other end running either through the bottom of the vat or side of the frame. Cold air will enter this tube from the cooler C, and as fast as it becomes rarefied it will expand and escape at the other end of the tube, and it will also carry off the animal odor which accumulates over the surface of the milk when the covers x y z are on tight.

There will be some little cooling from the waste-water which passes through the tube; but the milk will be brought to a lower temperature by means of the tube conducting cold air beneath its surface. To the outer end of the tube c a rubber tube is to be attached to conduct the waste-water down through the floor of the milk-room, or any receptacle that may be placed to receive the same. The cool air passes from the ice-cooler C down between the sides of the cover y, which is provided with a glass top in order to show the condition of the ice. D is a cooler, provided with an interior cylinder, d, which is filled with ice and covered with a cover, d'. This cooler is intended to be used in very warm weather, when it is placed on the side of the vat B.

The milk is first strained into the cooler D, which takes a large portion of the animal heat. It then passes into the vat B at a temperature of 60° or 65° Fahrenheit. After the vat is covered the cold air from the ice-cooler C will bring the milk down to a temperature of about 54° Fahrenheit. It has been ascertained that milk at this temperature gives a better quality of butter, and a greater quantity of it, than at a higher temperature.

Having thus fully described my invention, what I claim as new, and desire to secure by Letters Patent, is—

1. The combination of the cooler D, provided with interior cylinder d, vat B, and frame A, substantially in the manner and for the purposes set forth.

2. The combination of the frame A, vat B, ice-cooler C, tube c, cooler D, provided with interior cylinder d, arranged, constructed, and operating substantially in the manner and for the purposes set forth.

In testimony that I claim the foregoing as my own I affix my signature in presence of two witnesses.

NELSON D. FERGUSON.

Witnesses:
 SILAS G. CARLEY,
 HERBERT V. FERGUSON.